Sept. 26, 1939.  C. C. FARMER  2,174,408
BRAKE MECHANISM
Filed Nov. 13, 1937  3 Sheets-Sheet 2
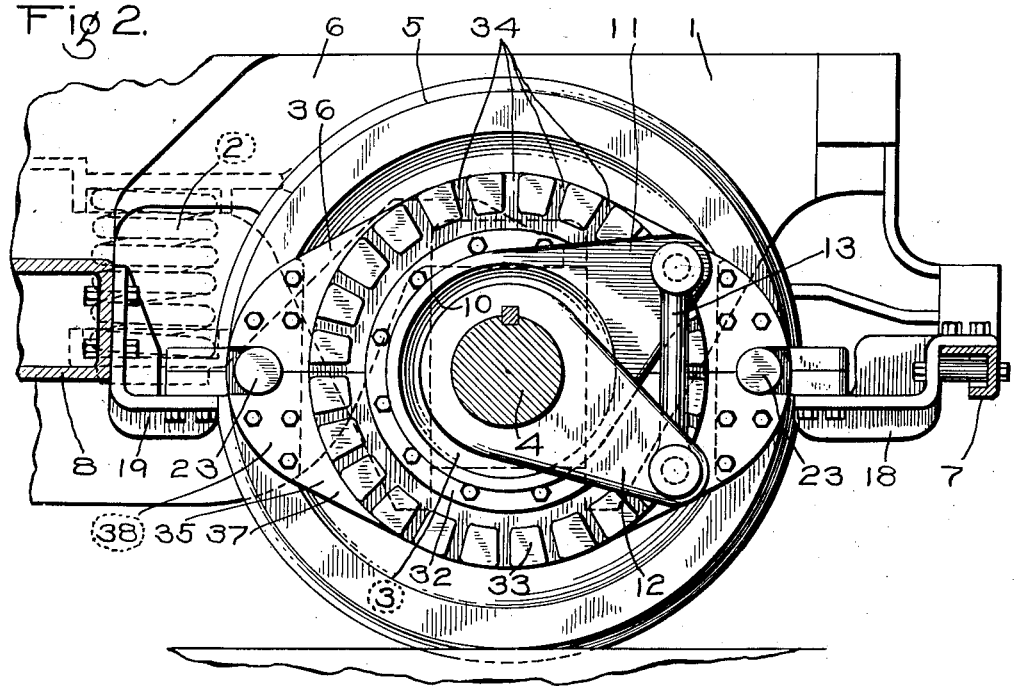
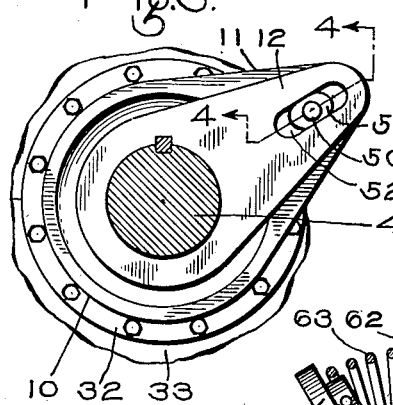
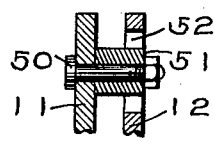
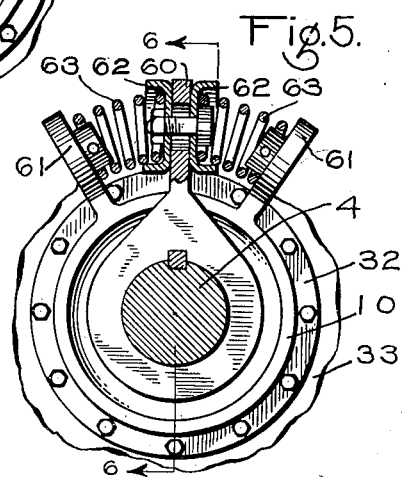
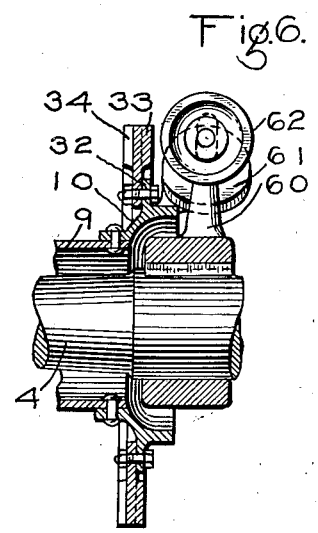
INVENTOR
CLYDE C. FARMER
BY Wm. M. Cady
ATTORNEY Sept. 26, 1939. C. C. FARMER 2,174,408
BRAKE MECHANISM
Filed Nov. 13, 1937 3 Sheets-Sheet 3
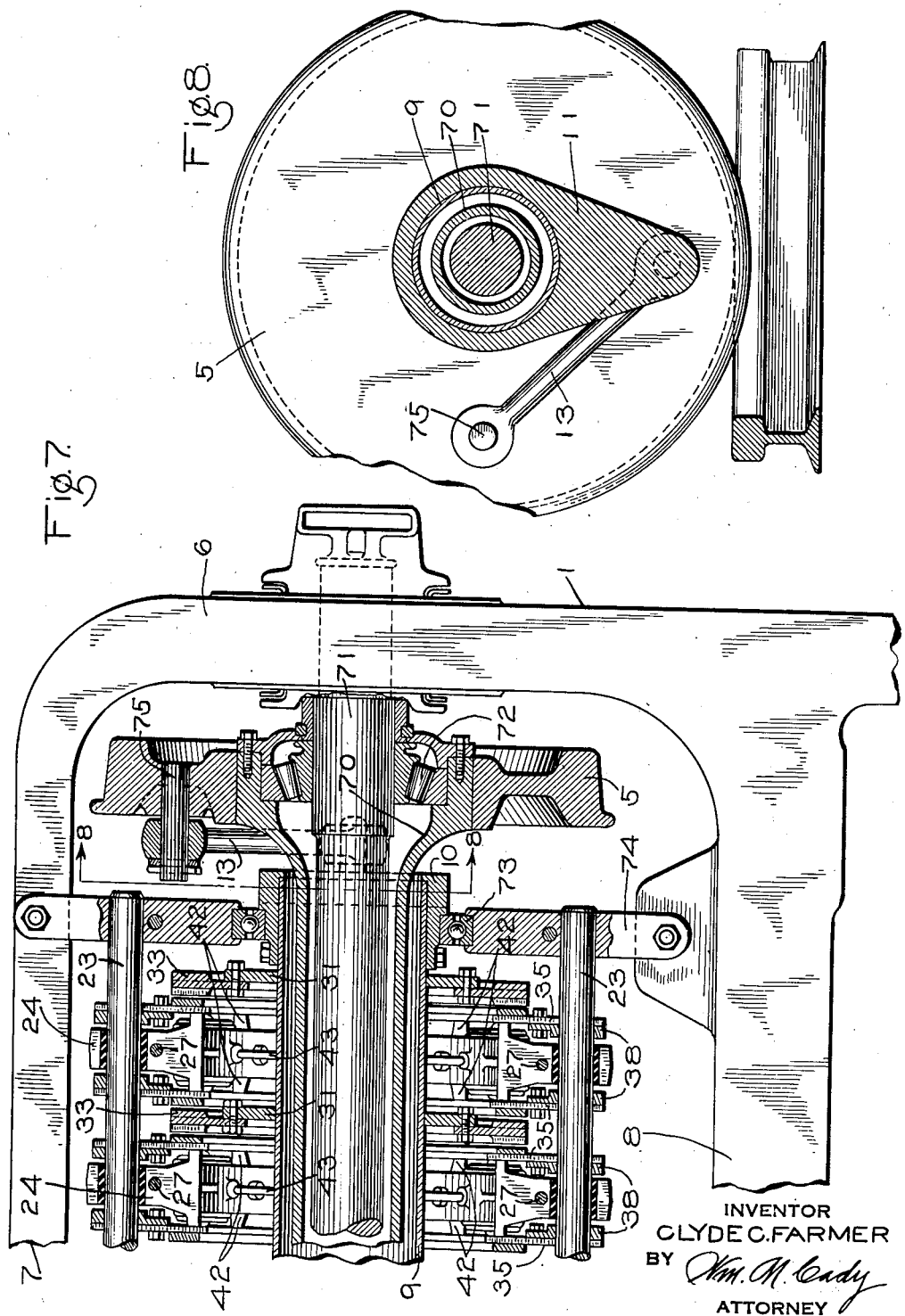
INVENTOR
CLYDE C. FARMER
BY
ATTORNEY Patented Sept. 26, 1939

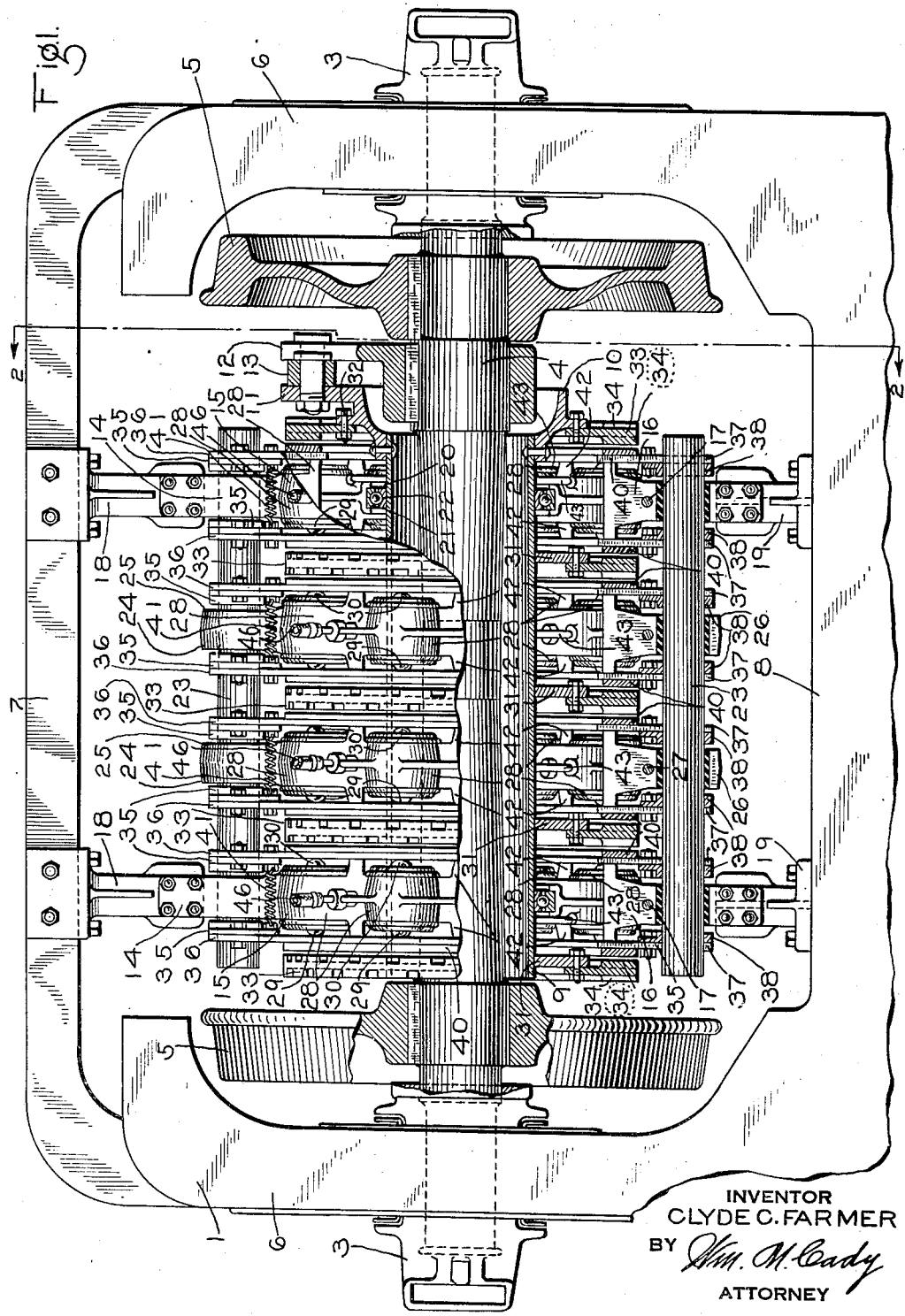

2,174,408

UNITED STATES PATENT OFFICE 2,174,408

BRAKE MECHANISM

Clyde C. Farmer, Pittsburgh, Pa., assignor to The Westinghouse Air Brake Company, Wilmerding, Pa., a corporation of Pennsylvania Application November 13, 1937, Serial No. 174,383

9 Claims. (Cl. 188—59)

This invention relates to brake mechanisms for railway vehicles and more particularly to a brake mechanism or unit of the friction disk or ring type for a wheel and axle assembly of the vehicle and embodying rotatable and non-rotatable friction brake elements and means for causing the brake elements to frictionally engage with each other to effect a braking action between the elements and for causing the disengagement of the brake element to effect a releasing action of the elements.

The principal object of the present invention is to provide an improved brake mechanism or unit of the above mentioned type.

Heretofore, in designing a friction disk brake mechanism or unit for a wheel and axle assembly of a railway vehicle, it has been proposed to support the brake mechanism or unit as a whole directly from the assembly. On a railway vehicle each brake mechanism or unit will add considerable unsprung or dead weight to each assembly to which it is applied. This additional dead weight will increase the severity of the usual pounding action of the wheels on the track rails at rail joints, cross overs and the like, and therefore increase the tendency for the wheels to damage the rails. With this in view, it is another object of the invention to provide a friction disk brake mechanism or unit for a wheel and axle assembly which, while acting on the assembly for braking purposes, will be carried by a spring supported part of the vehicle, so as to decrease severity of the pounding action of the wheels on the rails.

According to this object the brake mechanism or unit as a whole is carried by the truck frame which is spring supported from the wheel and axle assembly in the usual manner and at the same time is adapted to effect direct braking action of the assembly. Besides acting to decrease the severity of the pounding action between the wheels and the rails this method of supporting the brake mechanism also serves to prevent the usual heavy uncushioned shocks to which the wheels and axle assemblies are subjected in transit from being transmitted to the brake mechanism, thus reducing to a minimum the possibility of damage to the mechanism due to such shock.

Other objects and advantages will appear in the following more detailed description of the invention.

In the accompanying drawings Fig. 1 is a plan view, partly in section, of a portion of a railway vehicle truck embodying the invention; Fig. 2 is a fragmentary sectional view taken longitudinally of the truck on the line 2—2 of Fig. 1 and showing one form of connection between an axle of the truck and the brake mechanism; Fig. 3 is a fragmentary sectional view similar to Fig. 2 and showing another form of connection between the axle and the brake mechanism; Fig. 4 is a fragmentary sectional view taken on the line 4—4 of Fig. 3; Fig. 5 is a fragmentary sectional view of still another form of connection between the axle and the brake mechanism; Fig. 6 is a sectional view of this last mentioned connection taken on the line 6—6 of Fig. 5; Fig. 7 is a fragmentary plan view, partly in section, of a railway truck embodying a different form of wheel and axle assembly and embodying the invention; and Fig. 8 is a sectional view taken on the line 8—8 of Fig. 7, the truck frame and some of the parts associated therewith being omitted.

As illustrated in Figs. 1 and 2, the invention is embodied in a railway vehicle truck which may comprise a truck frame 1, which is supported through the medium of springs 2 and journal boxes 3 by axles 4 which are carried by and rotative with the usual wheels 5, only one wheel and axle assembly and the associated journal boxes, a truck frame supporting spring and adjacent parts of the truck being shown, these parts being deemed all that is necessary to clearly illustrate the embodiment of the invention in a vehicle truck.

The truck frame may be of any desired construction but is shown as being of the cast type having spaced parallel side frames 6 which are connected together at their ends by transversely extending end pieces 7 and adajacent the transfer center line of the truck are connected together by spaced parallel transversely extending transoms 8, only one of said end pieces and one of the transoms being shown.

Located between the wheels 5 and extending longitudinally of and encircling the axle 4 is a rotatable tubular member 9 having secured to one end thereof a hub 10 having a radially extending arm 11 which is operatively connected to a radially extending arm 12 secured to and rotatable with the axle 4, the force transmitting connection between the arms 10 and 11, as shown in Figs. 1 and 2, being in the form of a connecting rod 13 which extends between and is pivotally connected at its ends to the arms by means of suitable pins or bolts.

Located adjacent each end of the tubular member 9 and encircling the member and thereby the axle 4, is a substantially annular brake cylinder device 14 which comprises upper and lower substantially segmental members 15 and 16, respectively, which extend transversely of the axle and which, at each side of the axle are clamped together by a bolt 17. At one side of the member each of these brake cylinder devices rests on and is rigidly secured to a bracket 18 which is rigidly secured to the end piece 7 of the truck frame, and at the other side of the member the brake cylinder device rests on and is rigidly secured to a bracket 19 which is rigidly secured to the adjacent transom 8 of the truck frame. The medium employed for securing the brake cylinder devices 14 to the brackets 18 ant 19 are in the form of bolts which are readily removable, so as to facilitate the removal or replacement of the members 15 and 16 when such removal and replacement is desirable.

Interposed between each of the brake cylinder devices 14 and the member 9 is an anti-friction bearing preferably of the ball type having an inner ball race 20, an outer ball race 21 and balls 22 interposed between the race members in the usual manner, the inner race encircling the member 9 and being rigidly secured thereto in any desired manner. The outer ball race 21 is rigidly clamped between the upper and lower members 15 and 16, respectively, of the brake cylinder device against rotation.

From the foregoing description it will be understood that the member 9 is supported by and freely rotatable relative to the brake cylinder devices 14 and that, due to the arms 11 and 12 being operatively connected together by the connecting rod 13, rotation of the axle 4 causes the member to rotate about its axis in the same direction as that of the rotation of the axle.

Located on each side of the member 9 is a support member or bar 23 which extends transversely of the truck and which at each end is clamped between the upper and lower members 15 and 16, respectively, of the adjacent brake cylinder device 14.

From this it will be seen that the bars 23 are held rigidly in place against movement relative to the truck frame by these brake cylinder devices.

Arranged between the brake cylinder devices 14 are two brake cylinder devices 24 which are spaced an equal distance from each other and from the brake cylinder devices 14 in the direction of the length of the member 9. Each of these brake cylinder devices encircles but does not engage the member 9, and comprises upper and lower segmental members 25 and 26 which are rigidly but removably clamped together and to the bar 23 by means of a bolt 27, the bar serving to support the brake cylinder devices 24 and to prevent rotation thereof.

Each segmental member of each of the brake cylinder devices 14 and 24 is provided with a plurality of radially arranged small circular brake cylinders 28 whose axes are parallel with the axis of the member 9. Each brake cylinder contains two circular oppositely facing pistons which are movable outwardly in opposite directions by fluid under pressure to effect an application of the brakes, one of said pistons having a stem 29 which projects slightly beyond one side of the brake cylinder device and the other piston having a stem 30 which projects slightly beyond the opposite side of the brake cylinder device. The brake cylinder and piston arrangement may be identical with that of the brake mechanism or unit fully disclosed in the pending joint application of Joseph C. McCune and myself, Serial No. 170,240, filed October 21, 1937, and in view of this and to the fact that the piston stems are shown, a detail showing of the arrangement is deemed unnecessary and has been omitted.

Secured to the member 9 so as to rotate therewith are a plurality of spaced radially extending circular flanges 31 which are arranged one between the wheel 5 at the left hand side of the truck and the adjacent brake cylinder device 14 and one intermediate each two brake cylinder devices. The hub 10 of the arm 11 is provided with a corresponding flange 32 which is located between the wheel 5 and the adjacent brake cylinder device 14 at the right hand side of the truck.

Removably secured to the edge portion of each flange 31 and the flange 32, so as to rotate therewith, is an annular friction brake element 33 which, as shown, may comprise two segmental pieces that are arranged end to end to form the complete element. Each side of this element is provided with a friction face having a plurality of radially arranged cross grooves 34 formed therein, the grooves on one side being staggered with relation to the grooves on the other side.

Disposed between each brake cylinder device and the rotatable brake element 33 is a non-rotatable brake element 35 which encircles the member 9 and which is movable in directions longitudinally of the member into and out of frictional engagement with the adjacent friction face of an adjacent element 33. Each non-rotatable element 35 may comprise upper and lower vertically aligned flat plates 36 and 37, respectively, the ends of which plates, at each side of the member 9, are rigidly but removably secured to a bracket 38 having a bearing portion which encircles and slidably engages the adjacent bar 23 in such a manner as to permit movement of the element longitudinally of the member and at the same time prevent the element from rotating. Each element may also comprise an annular brake shoe 40 which preferably consists of two segmental disk like pieces which are secured to the plates 36 and 37 in end to end relationship to each other to form an annulus, and which on one side is provided with a plain friction face adapted to engage with the adjacent grooved friction face of the adjacent rotatable brake element 33 to effect an application of the brakes.

Extending between and secured to the non-rotatable brake elements 35 located at opposite sides of each brake cylinder device are release springs 41 which normally maintain these elements in their release position as shown in Fig. 1. In this position the elements engage stops 42 which, in the present embodiment of the invention, are shown integral with the adjacent brake cylinder device, and also engage or are at least in close proximity to the piston stems of the brake cylinder device.

It will be apparent from the drawings and the foregoing description that the brake unit as a whole is supported by the truck frame 1 which in turn is supported from the axle 4 through the medium of the springs 2, which springs serve to cushion vertically directed shocks between the truck frame and axle and thereby effectively prevent uncushioned pounding action of the wheels on the rails.

In operation rotary motion of the axle is transmitted to the member 9 and consequently to the brake elements 33 through the medium of the operatively connected arms 11 and 12. It should here be mentioned that the axis of the member 9 and that of the axle 4 are normally coincident with each other and that when, due to load, wear of the journal bearings of the truck, or to unavoidable service shocks, the truck frame and thereby member 9 are caused to move downwardly relative to the axle, the operative connection between the axle and member 9 being flexible due to the pivoted connection between the connecting rod 13 and the arms 11 and 12 will compensate for the eccentricity of the member to prevent any binding action being set up in the connection.

Each of the segmental members of each brake cylinder is provided with a fluid pressure conduit in the form of a pipe 43 which is connected to each brake cylinder by way of a suitable flow restricting passage, not shown, which pipe may be connected through a suitable passage in the device to a supply conduit 46 through which fluid under pressure is adapted to be supplied or released by any desired control means, not shown.

In operation, when it is desired to effect an application of the brakes, fluid under pressure is supplied through conduits 46 and connected passages and conduits to all of the brake cylinders, which causes all of the brake cylinder pistons to move outwardly, the piston stems thereof forcing the non-rotatable brake elements 35 into frictional braking engagement with the friction braking faces of the rotatable braking elements 33. The braking action set up between the rotatable and non-rotatable braking elements is transmitted through the member 9, hub 10, arm 11, connecting rod 13 and arm 12 to the wheel and axle assembly. The brake mechanism thus acts to check or stop the rotation of the wheel and axle assembly.

It will here be understood that when the axle assembly, member 9 and rotatable brake elements are rotating, air currents will be caused to flow through the brake unit and across the adjacent faces of each pair of rotatable and non-rotatable brake elements in the same manner as fully described and claimed in the aforementioned pending application. These air currents dissipate heat from the several parts of the unit and also assist in maintaining the friction surfaces of the brake elements substantially free of dust which may consist of minute particles of metal worn away from the friction surfaces of the brake element. When the rotatable brake element is rotating at slow speeds these particles of metal will, due to the force of gravity, fall free of the unit, all as fully described in said pending application.

When it is desired to release the brakes, fluid under pressure is released from the brake cylinders by way of the conduits 43 and 46 and connected passages whereupon the release springs 41 act to move the non-rotatable elements 35 toward their respective brake cylinder devices out of braking engagement with the rotatable brake elements 33, the non-rotatable brake elements as they are thus moved acting to move the brake cylinder pistons 29 and 30 to their innermost or normal release position.

In Figs. 3 and 4 a modification of the operative connection between the arms 11 and 12 is illustrated. In this modification the arms, instead of being connected together through the medium of a link 13, are connected by means of a bolt 50 and a cross head 51, the bolt being connected to the arm 11 and the cross head being mounted in a slot 52 in the arm 12 to permit free sliding movement of the cross head relative to the arm in directions longitudinally thereof. This construction provides a connection between the member 9 and the axle 4 which will compensate for any eccentricity of the member 9 relative to the axle to insure the free rotation of the rotatable brake elements by the axle.

In passenger vehicles where the deflection of the truck springs, due to load and to wear of the journal bearings, is slight, the eccentricity of the member 9 with relation to the axle 4 will be negligible, however, in freight cars this eccentricity may be great enough to cause the rotary speed of the member 9 to vary relative to the speed of the axle enough to cause heavy shocks to be set up in the apparatus. To cushion such shocks and to materially assist in preventing them from occurring a connection such as shown in Figs. 5 and 6 may be employed between the member 9 and axle 4. In this construction there is secured to the axle 4 so as to rotate therewith an arm 60 which extends between spaced arms 61 carried by the hub 10 secured to the member 9. The arm 60 has slidably mounted thereon spring seats 62 which are arranged one on each side of the arm, and interposed between each spring seat and the adjacent arm 61 is a heavy spring 63, which constitutes the force transmitting and cushioning medium between the arms, one of these springs acting when the vehicle is traveling in one direction and the other acting when the vehicle is traveling in the opposite direction.

In Figs. 7 and 8 the invention is shown associated with a wheel and axle assembly of the type in which the wheels are mounted on and connected together by a tubular member 70 which encircles an axle 71 and in which there is interposed between the tubular member and the axle a roller bearing 72.

In this embodiment of the invention the tubular member 9 is rotatably mounted at each end in an anti-friction bearing 73 carried by a support 74 which is rigidly secured to the truck frame. This method of mounting the member 9 differs from that shown in Fig. 1 in that the support 74 is not in the form of a brake cylinder device as is the case in the embodiment shown in Fig. 1.

A further difference between this embodiment of the invention and that illustrated in Fig. 1 is that the connecting rod 13 which is pivotally connected at one end to the arm 11 of the hub 10 is pivotally connected at its opposite end directly to the web of the adjacent wheel by means of a pin 75, instead of being connected to an arm carried by the axle as shown in Fig. 1.

Aside from the differences above mentioned the several parts of the brake unit may be constructed and arranged in the same manner as the corresponding parts of the brake unit illustrated in Fig. 1.

*General considerations*

In the drawings the brake unit has been shown as comprising four brake cylinder devices but it is to be understood that the unit may comprise one or any number of such devices and the suitable number of rotatable and non-rotatable brake elements, the number of such devices employed being dependent upon the braking action it is desired to obtain.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a vehicle brake, in combination, a wheel and axle assembly to be braked, a truck frame carried by said assembly, a brake mechanism encircling the axle of said assembly and carried by said truck frame, said mechanism comprising a rotatable brake element, a non-rotatable brake element movable into frictional braking engagement with the rotatable brake element to produce braking force, and means for applying the braking force produced by the mechanism to said assembly, said means comprising an arm secured to said assembly, an arm secured to said rotatable brake element, and force transmitting means connecting the arms.

2. In a vehicle brake, in combination, a wheel and axle assembly to be braked, a truck frame carried by said assembly, a brake mechanism encircling the axle of said assembly and carried by said truck frame, said mechanism comprising a rotatable brake element, a non-rotatable brake element movable into frictional braking engagement with the rotatable brake element to produce braking force, and means for applying the braking force produced by the mechanism to said assembly, said means comprising an arm secured to said axle, an arm secured to said rotatable brake element and a flexible connection between said arms.

3. In a vehicle brake, in combination, a wheel and axle assembly to be braked, a truck frame carried by said assembly, a brake mechanism encircling the axle of said assembly and carried by said truck frame, said mechanism comprising a rotatable brake element, a non-rotatable brake element movable into frictional braking engagement with the rotatable brake element to produce braking force, and means for transmitting the braking force produced by the mechanism to said assembly, said means comprising an arm secured to said axle, an arm secured to said rotatable brake element and a connecting rod pivotally connected to each of said arms.

4. In a vehicle brake, in combination, a wheel and axle assembly to be braked, a truck frame carried by said assembly, a brake mechanism encircling the axle of said assembly, and carried by said truck frame, said mechanism comprising a rotatable brake element, a non-rotatable brake element movable into frictional braking engagement with said rotatable brake element to produce braking force, and means for transmitting the braking force produced by the mechanism to said assembly, said means comprising an arm secured to said axle, an arm secured to said rotatable brake element, a cross head mounted in one of said arms to move longitudinally thereof, and a pin connecting said cross head and the other of said arms.

5. In a vehicle brake, in combination, a wheel and axle assembly to be braked, a truck frame carried by said assembly, a plurality of brake cylinder devices encircling said axle and rigidly secured together and to said truck frame, a rotatable tubular member encircling the axle of said assembly and journaled adjacent its ends in the two end brake cylinder devices, spaced brake elements carried by said tubular member and rotatable therewith, non-rotatable brake elements movable by said brake cylinder devices into frictional braking engagement with said rotatable brake elements, and means operatively connecting said axle and tubular member together to transmit rotary motion of the axle to said member and to transmit the braking force of the mechanism to said axle.

6. In a vehicle brake, in combination, a wheel and axle assembly to be braked, a truck frame carried by said assembly, and comprising a transversely extending end member and a transversely extending transom, a plurality of brake cylinder devices encircling said axle and extending between and rigidly secured to said end member and transom, a rotatable tubular member encircling the axle of said assembly and journaled adjacent its ends in the two end brake cylinder devices, spaced brake elements carried by said tubular member and rotatable therewith, non-rotatable brake elements movable by said brake cylinder devices into frictional braking engagement with said rotatable brake element, and means operatively connecting said axle and tubular member together to transmit rotary motion of the axle to said member and to transmit the braking force of the mechanism to said axle.

7. In a vehicle brake, in combination, a wheel and axle assembly to be braked, a truck frame carried by said assembly, a plurality of brake cylinder devices encircling said axle and rigidly secured together and to said truck frame, a rotatable tubular member encircling the axle of said assembly and journaled adjacent its ends in the two end brake cylinder devices, spaced brake elements carried by said tubular member and rotatable therewith, non-rotatable brake elements carried by said truck frame, said brake elements being adapted to frictionally engage with each other to produce braking force, and means operatively connecting said assembly and tubular member together to transmit rotary motion of the assembly to said member and to transmit the braking force of the mechanism to the assembly.

8. In a vehicle brake, in combination, a truck frame, a truck frame supporting wheel and axle assembly, a rotatable tubular member encircling the axle of the assembly and being operatively carried by the truck frame, the end of said member terminating short of the wheels of the assembly, a brake element carried by said member and being rotatable therewith, a brake element carried by the truck frame adapted to frictionally engage the rotatable brake element for braking said member, and a combined driving and braking force transmitting means operatively connecting said tubular member and assembly, said means comprising an arm secured to one end of said tubular member, and a combined actuating and force transmitting member operatively connecting said arm and wheel.

9. In a vehicle brake, in combination, a truck frame, a truck frame supporting wheel and axle assembly, a rotatable tubular member encircling the axle of the assembly and being operatively carried by the truck frame, the ends of said member terminating short of the wheels of the assembly, a brake element carried by said member and being rotatable therewith, a brake element carried by the truck frame adapted to frictionally engage the rotatable brake element for braking said member, and a combined driving and braking force transmitting means operatively connecting said tubular member and assembly, said means comprising an arm secured to one end of said tubular member, and a combined actuating and force transmitting member operatively connected at one end to said arm and operatively connected at its other end to the web of said wheel.

CLYDE C. FARMER.